United States Patent
Okabe et al.

(10) Patent No.: US 10,826,084 B2
(45) Date of Patent: Nov. 3, 2020

(54) FUEL CELL

(71) Applicant: TOYOTA JIDOSHA KABUSHIKI KAISHA, Toyota (JP)

(72) Inventors: Hiroki Okabe, Mishima (JP); Manabu Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 62 days.

(21) Appl. No.: 16/364,944

(22) Filed: Mar. 26, 2019

(65) Prior Publication Data
US 2019/0305327 A1    Oct. 3, 2019

(30) Foreign Application Priority Data

Mar. 28, 2018  (JP) ................. 2018-063275

(51) Int. Cl.
| | |
|---|---|
| *H01M 8/02* | (2016.01) |
| *H01M 8/026* | (2016.01) |
| *H01M 8/0267* | (2016.01) |
| *H01M 8/04029* | (2016.01) |
| *H01M 8/2457* | (2016.01) |
| *H01M 8/241* | (2016.01) |
| *H01M 8/1004* | (2016.01) |
| *H01M 8/04089* | (2016.01) |
| *H01M 8/1018* | (2016.01) |

(52) U.S. Cl.
CPC ......... *H01M 8/026* (2013.01); *H01M 8/0267* (2013.01); *H01M 8/04029* (2013.01); *H01M 8/04089* (2013.01); *H01M 8/1004* (2013.01); *H01M 8/241* (2013.01); *H01M 8/2457* (2016.02); *H01M 2008/1095* (2013.01)

(58) Field of Classification Search
CPC .............. H01M 8/026; H01M 8/0267; H01M 8/04029; H01M 8/2457; H01M 8/241; H01M 8/1004; H01M 8/04089; H01M 2008/1095; H01M 8/0263; H01M 8/1006; H01M 8/0258; H01M 8/0265; H01M 8/2483
See application file for complete search history.

(56) References Cited

U.S. PATENT DOCUMENTS

2013/0337359 A1    12/2013    Sugiura et al.

FOREIGN PATENT DOCUMENTS

| JP | 2006-147466 | 6/2006 |
|---|---|---|
| JP | 2008-282777 | 11/2008 |
| JP | 2014-026960 | 2/2014 |

*Primary Examiner* — Cynthia K Walls
(74) *Attorney, Agent, or Firm* — Finnegan, Henderson, Farabow, Garrett & Dunner, LLP

(57) ABSTRACT

A fuel cell includes: a membrane electrode assembly; and a separator disposed on one side of the membrane electrode assembly, wherein the separator includes flow path grooves through which reactant gas flows between the separator and the membrane electrode assembly, the flow path grooves include: wavy grooves wavily extending in a first direction and arranged in a second direction orthogonal to the first direction; and a linear groove linearly extending in the first direction, the wavy grooves include: a first wavy groove located closest to the linear groove among the wavy grooves; and a second wavy groove located opposite to the linear groove with respect to the first wavy groove, and amplitude of the first wavy groove is smaller than that of the second wavy groove.

8 Claims, 4 Drawing Sheets

FUEL CELL

CROSS-REFERENCE TO RELATED APPLICATION

This application is based upon and claims the benefit of priority of the prior Japanese Patent Application No. 2018-063275, filed on Mar. 28, 2018, the entire contents of which are incorporated herein by reference.

TECHNICAL FIELD

The present disclosure relates to a fuel cell.

BACKGROUND

A separator of a fuel cell is formed with flow path grooves through which reactant gas flows between the separator and a membrane electrode assembly. A part of the reactant gas flowing in the flow path grooves is supplied to the membrane electrode assembly, so that the power generation reaction occurs in the membrane electrode assembly. For example, in Japanese Unexamined Patent Application Publication No. 2014-026960, the separator is formed with wavy grooves and a linear groove as the flow path grooves.

Since the wavy grooves and the linear grooves differ in shape, there is a large interval between the linear groove and the wavy groove closest to the linear groove. If such an interval is too large, the reactant gas might not be sufficiently supplied to the membrane electrode assembly, and the power generation performance of the fuel cell might be deteriorated.

SUMMARY

It is an object of the present disclosure to provide a fuel cell that suppresses deterioration of power generation performance.

The above object is achieved by a fuel cell including: a membrane electrode assembly; and a separator disposed on one side of the membrane electrode assembly, wherein the separator includes flow path grooves through which reactant gas flows between the separator and the membrane electrode assembly, the flow path grooves include: wavy grooves wavily extending in a first direction and arranged in a second direction orthogonal to the first direction; and a linear groove linearly extending in the first direction, the wavy grooves include: a first wavy groove located closest to the linear groove among the wavy grooves; and a second wavy groove located opposite to the linear groove with respect to the first wavy groove, and amplitude of the first wavy groove is smaller than that of the second wavy groove.

Since the amplitude of the first wavy groove closest to the linear groove is smaller than the amplitude of the second wavy groove, it is possible to suppress an increase in the interval between the linear groove and the first wavy groove. It is therefore possible to suppress the reactant gas from not being supplied to a part of the membrane electrode assembly corresponding to a port where the interval is increased, and to suppress the deterioration of the power generation performance of the fuel cell.

Wavelengths of the first and second wavy grooves may be identical to each other.

Phases of the first and second wavy grooves may be identical to each other.

Wavelengths of all of the wavy grooves may be identical to each other, and phases of all of the wavy grooves may be identical to each other.

The linear groove may be located below the wavy grooves in a gravity direction.

The wavy grooves may include a third wavy groove located opposite to the first wavy groove with respect to the second wavy groove, and amplitude of the second wavy groove may be smaller than or equal to amplitude of the third wavy groove.

Amplitude of the wavy groove may be smaller as the wavy groove is located closer to the linear groove.

The separator may be an anode separator disposed on an anode side of the membrane electrode assembly.

DETAILED DESCRIPTION

Figure 1:
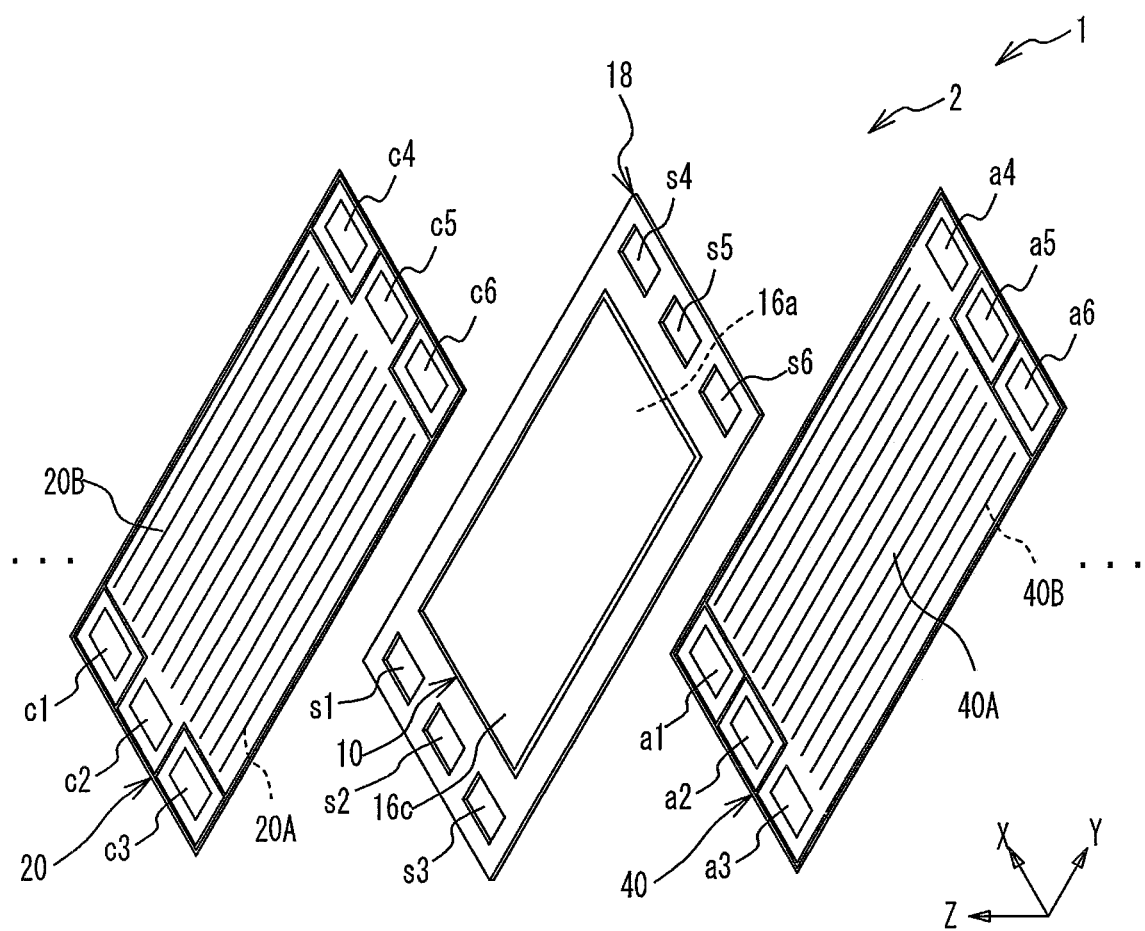
FIG. 1 is an exploded perspective view of a unit cell of a fuel cell.

FIG. 1 is an exploded perspective view of a unit cell 2 of a fuel cell 1. The fuel cell 1 is configured by stacking unit cells 2. FIG. 1 illustrates only one unit cell 2, and omits other unit cells. The unit cell 2 is stacked with other unit cells in the Z direction illustrated in FIG. 1. The unit cell 2 has a substantially rectangular shape. The longitudinal direction and the short direction of the unit cell 2 correspond to the Y direction and the X direction illustrated in FIG. 1, respectively.

The fuel cell 1 is a polymer electrolyte fuel cell that generates electric power with a fuel gas (for example, hydrogen) and an oxidant gas (for example, oxygen) as reactant gases. The unit cell 2 includes: a membrane electrode gas diffusion layer assembly (MEGA) 10; a support frame 18 supporting the MEGA 10; a cathode separator 20 and an anode separator 40 (hereinafter referred to as separators) sandwiching the MEGA 10. The MEGA 10 has a cathode gas diffusion layer 16c and an anode gas diffusion layer 16a (hereinafter referred to as diffusion layers). The support frame 18 has a substantially frame shape, and its inner peripheral side is joined to a peripheral region of the MEGA 10.

Holes c1 to c3 are formed along one of two short sides of the separator 20, and holes c4 to c6 are formed along the other side. Likewise, holes s1 to s3 are formed along one side of two short sides of the support frame 18, and holes s4 to s6 are formed along the other side. Likewise, holes a1 to a3 are formed along one side of two short sides of the separator 40, and holes a4 to a6 are formed along the other side. The holes c1, s1, and a1 communicate with one another to define a cathode inlet manifold. Likewise, the holes c2, s2, and a2 define a coolant inlet manifold. The holes c3, s3, and a3 define an anode outlet manifold. The holes c4, s4, and a4 define an anode inlet manifold. The holes c5, s5, and a5 define a coolant outlet manifold. The holes c6, s6, and a6 define a cathode outlet manifold. In the fuel cell 1 according to the present embodiment, liquid cooling water is used as a coolant.

A surface of the separator 40 facing the MEGA 10 is formed with an anode flow path portion 40A (hereinafter referred to as flow path portion) which communicate the anode inlet manifold with the anode outlet manifold and along which the fuel gas flows. The surface of the separator 20 facing the MEGA 10 is formed with a cathode flow path portion 20A (hereinafter referred to as flow path portion) which communicate the cathode inlet manifold with the cathode outlet manifold and along which the oxidant gas flows. The surface of the separator 40 opposite to the flow path portion 40A and the surface of the separator 20 opposite to the flow path portion 20A are respectively formed with coolant flow path portions 40B and 20B (hereinafter referred to as flow path portions) which communicate the coolant inlet manifold with the coolant outlet manifold and along which the coolant flows. The flow path portions 20A and 20B extend in the longitudinal direction of the separator 20 (Y direction). Likewise, the flow path portions 40A and 40B extend in the longitudinal direction of the separator 40 (Y direction). Each flow path portion is basically provided in a region, facing the MEGA 10, of the separator in the XY plane. The separators 20 and 40 are made of a material having a gas blocking property and electrical conductivity, and are thin plate shaped members formed by pressing stainless steel, metal such as titanium or titanium alloy.

Figure 2:
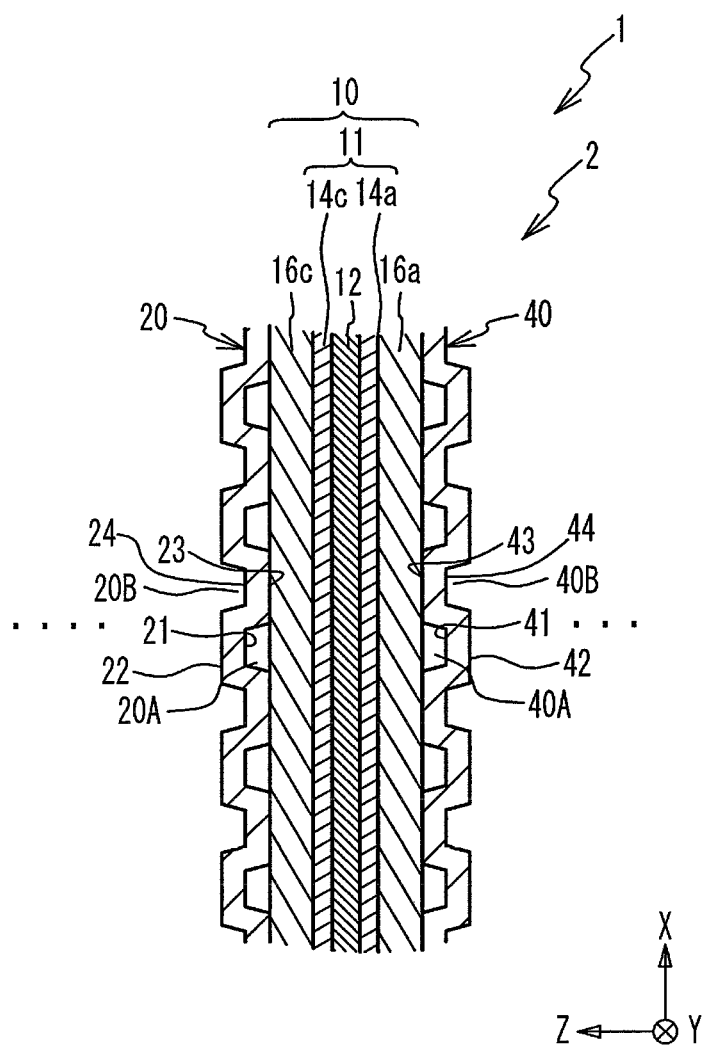
FIG. 2 is a partially cross-sectional view of the fuel cell where the unit cells are stacked.

FIG. 2 is a partially cross-sectional view of the fuel cell 1 where the unit cells 2 are stacked. FIG. 2 illustrates only one unit cell 2, and omits the other unit cells. FIG. 2 illustrates a cross section orthogonal to the Y direction.

The MEGA 10 includes the diffusion layers 16a and 16c, and a membrane electrode assembly (MEA) 11. The MEA 11 includes an electrolyte membrane 12, and an anode catalyst layer 14a and a cathode catalyst layer 14c (hereinafter referred to as catalyst layers) formed on one surface and the other surface of the electrolyte membrane 12, respectively. The electrolyte membrane 12 is a solid polymer thin film, such as a fluorine-based ion exchange membrane, with high proton conductivity in a wet state. The catalyst layers 14a and 14c are made by coating a catalyst ink containing a carbon support carrying platinum (Pt) or the like and an ionomer having proton conductivity on the electrolyte membrane 12. The diffusion layers 16a and 16c are made of a material having gas permeability and conductivity, for example, a porous fiber base material such as carbon fiber or graphite fiber. The diffusion layers 16a and 16c are joined to the catalyst layers 14a and 14c, respectively.

Each of the flow path portions 20A, 20B, 40A, and 40B has a wavy shape in cross section when viewed in the Y direction. Specifically, regarding the flow path portion 20A, a flow path groove 21, recessed away from the diffusion layer 16c, and a rib 23, protruding to and contacting with the diffusion layer 16c, are alternately arranged in the X direction. The cathode gas, flowing along the insides of the flow path grooves 21, is supplied to the catalyst layer 14c of the MEA 11 via the diffusion layer 16c. Further, regarding the flow path portion 20B, a rib 22, protruding opposite to the diffusion layer 16c and contacting with an anode separator of another unit cell (not illustrated) adjacent to the separator 20 in the −Z direction, and a flow path groove 24, receded away from this anode separator, are alternately arranged in the X direction. The coolant flows along the insides of the flow path grooves 24. Herein, the flow path grooves 21 and the ribs 22 are formed integrally on the front and rear surfaces, and the ribs 23 and the flow path grooves 24 are formed integrally on the front and rear surfaces. The flow path grooves 21 and 24 and the ribs 22 and 23 extend in the Y direction.

Likewise, regarding the flow path portion 40A, a flow path groove 41, recessed away from the diffusion layer 16a, and a rib 43, protruding to and contacting with the diffusion layer 16a are alternately arranged in the X direction. The anode gas, flowing along the insides of the flow path grooves 41, is supplied to the catalyst layer 14a of the MEA 11 via the diffusion layer 16a. Further, regarding the flow path portion 40B, a rib 42, protruding opposite to the diffusion layer 16a and contacting with a cathode separator of another unit cell (not illustrated) adjacent to the separator 40 in the +Z direction, and a flow path groove 44, receded away from this cathode separator, are alternately arranged in the X direction. The coolant flows along the insides of the flow path grooves 44. Herein, the flow path grooves 41 and the ribs 42 are formed integrally on the front and rear surfaces, and the ribs 43 and the flow path grooves 44 are formed integrally on the front and rear surfaces. The flow path grooves 41 and 44 and the ribs 42 and 43 extend in the Y direction.

Figure 3A:
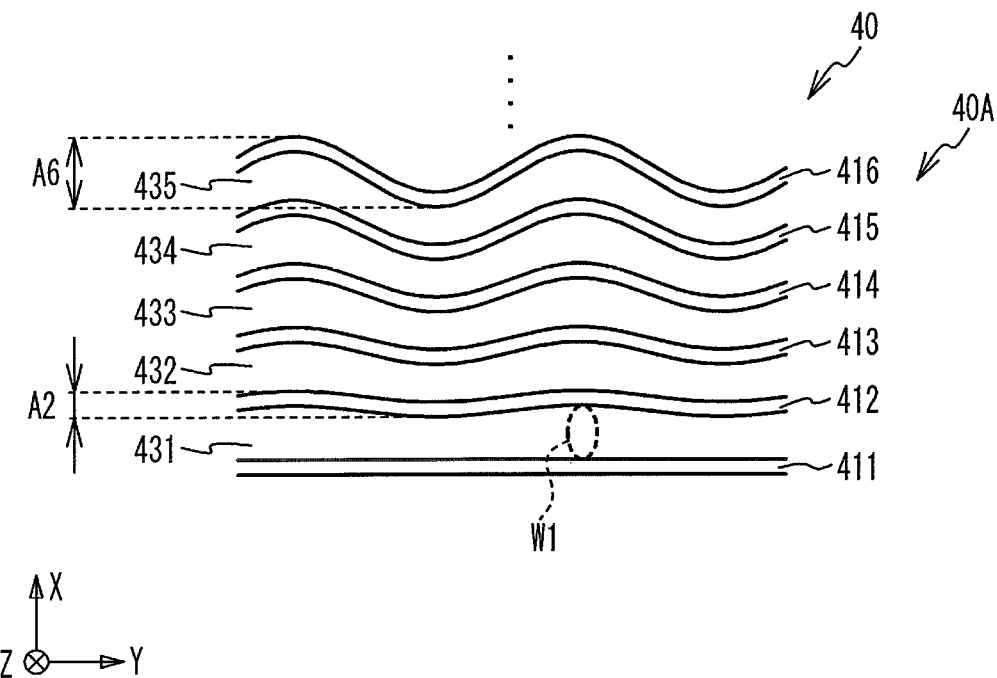
FIG. 3A is an enlarged view illustrating a part of a flow path portion of a separator in a present embodiment.

FIG. 3A is an enlarged view illustrating a part of the flow path portion 40A of the separator 40 in a present embodiment. FIG. 3A illustrates grooves 411 to 416 which are a part of flow path grooves 41, and ribs 431 to 435 which are a part of the ribs 43. The grooves 411 to 416 and the ribs 431 to 435 are arranged in the X direction. Among the grooves 411 to 416, the groove 411 is located furthest from the center in the −X direction, and the groove 416 is located furthest from the center in the +X direction. The ribs 431, 432, 433, 434, and 435 are located between the grooves 411 and 412, between the grooves 412 and 413, between the grooves 413 and 414, between the grooves 414 and 415, and between the grooves 415 and 416, respectively.

Although the groove 411 has a linear shape, each of the grooves 412 to 416 has a wavy shape. Additionally, in FIG. 1, the flow path portion 40A is simply illustrated by straight lines. The grooves 412 to 416 are examples of wavy grooves wavily extending in the Y direction and arranged in the X direction orthogonal to the Y direction. The groove 411 is an example of a linear groove linearly extending in the Y direction. Each of the ribs 432 to 435 also has a wavy shape, and the boundary between the rib 431 and the groove 412 also has a wavy shape. Among the grooves 412 to 416, the groove 412 is located closest to the groove 411. The groove 412 is an example of a first wavy groove located closest to the groove 411 among the grooves 412 to 416. Each of the grooves 413 to 416 is an example of a second wavy groove located opposite to the groove 411 with respect to the groove 412.

In a case where the groove 413 is an example of the second wavy groove, any grooves 414 to 416 are an example of a third wavy groove located opposite to the groove 412 with respect to the groove 413. In a case where the groove 414 is an example of the second wavy groove, any grooves 415 and 416 are an example of the third wavy groove located opposite to the groove 412 with respect to the groove 414. In a case where the groove 415 is an example of the second wavy groove, the groove 416 is an example of the third wavy groove located opposite to the groove 412 with respect to the groove 415.

The pitch intervals between the grooves 411 to 416 in the X direction are substantially the same. The grooves 412 to 416 each having a wavy shape have substantially the same wavelength and the same phase, but have different amplitude. Specifically, the grooves 412 to 416 are arranged in ascending order of the amplitude. In other words, the amplitude of the groove is smaller as being closer to the linear groove 411. For example, as illustrated in FIG. 3A, amplitude A2 of the groove 412 is smaller than amplitude A6 of the groove 416. In addition, the shape of the groove, located away from the groove 416 in the +X direction and not illustrated in FIG. 3A, is not limited.

Referring to FIG. 2, a description will be given of one of the main reasons why at least the grooves 412 to 416 and the ribs 431 to 435 are partially wavy shaped. For example, in a case where all of the flow path grooves 41 and the ribs 43 of the separator 40 and all of the flow path grooves 21 and the ribs 23 of the separator 20 are linear, if the relative position between the separators 20 and 40 is displaced from the desired position in the planar direction, the rib 23 of the separator 20 is positionally displaced from the rib 43 of the separator 40 in the X direction in the state where the MEGA 10 is sandwiched therebetween. Since the MEGA 10 has low rigidity, if the ribs 23 of the separator 20 are positionally displaced from the ribs 43 of the separator 40 in the X direction in a long range (for example, 4 mm or more) in the Y direction, the MEGA 10 might be bent to be locally subjected to strong stress, so that the strength of the MEA 11 might decrease. In contrast, in a case where the flow path grooves 21 and the ribs 23 of the separator 20, facing the grooves 412 to 416 and the ribs 431 to 435 each having a wavy shape via the MEGA 10, each has a linear shape, or a wavy shape different from the wavy shape of the grooves 412 to 416 in phase, amplitude, wavelength or the like, even if the relative position between the separators 20 and 40 is displaced from the desired position as described above, the MEGA 10 is suppressed from being bent by positionally displacing the ribs 23 of the separator 20 from the ribs 43 of the separator 40 in the X direction in a long range in the Y direction. This suppresses the decrease in strength of the MEA 11. In the present embodiment, the flow path grooves 21 and the ribs 23 of the separator 20, facing the grooves 412 to 416 and the ribs 431 to 435 via the MEGA 10, each has a linear shape, but they not limited thereto.

Figure 3B:
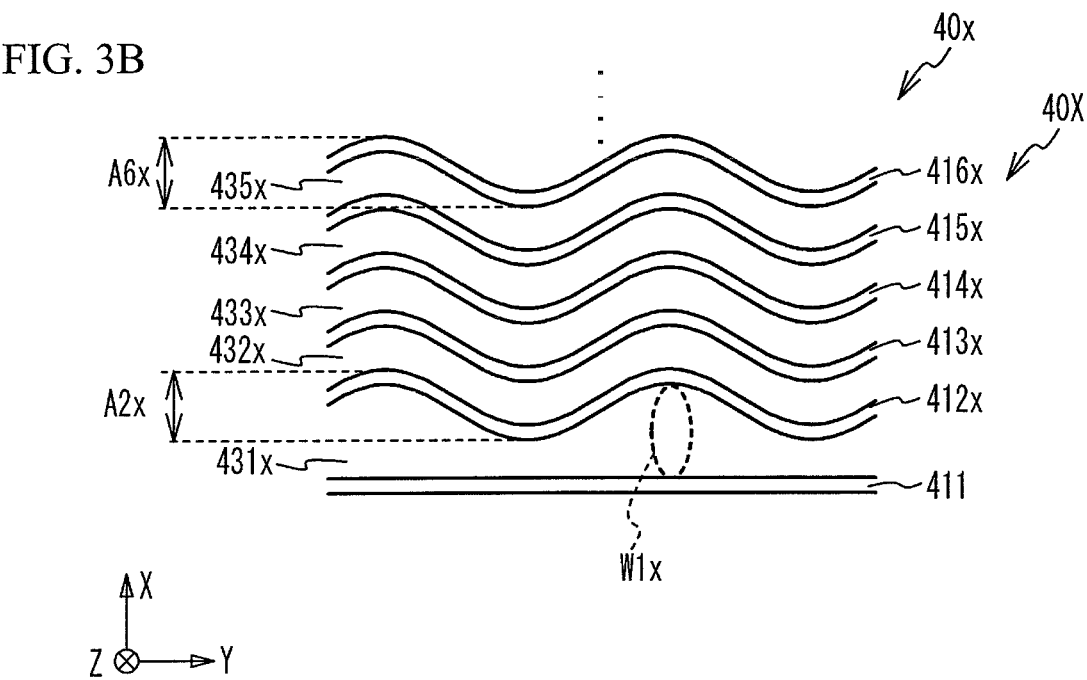
FIG. 3B is an enlarged view illustrating a part of a flow path portion of a separator in a comparative example.

FIG. 3B is an enlarged view illustrating a part of a flow path portion 40X of a separator 40x in a comparative example. FIG. 3B corresponds to FIG. 3A. Grooves 412x to 416x and the ribs 432x to 435x of the separator 40x have substantially the same amplitude as well as wavelength and phase. Specifically, as illustrated in FIG. 3B, each amplitude of the grooves 412x to 415x and the ribs 432x to 435x is substantially the same as amplitude A6x of the groove 416x. Herein, the interval, in the X direction, between the groove 411 having a linear shape and the groove 412x having a wavy shape closest to the groove 411, in other words, the width of the rib 431x in the X direction differs depending on a position in the Y direction. The rib 431x has a part W1x where the width is the maximum. Therefore, the contact area between the rib 431x and the diffusion layer 16a is increased at this part W1x. Thus, the anode gas flowing in the groove 411 and the groove 412x might not be sufficiently supplied to a part of the MEA 11 that is positioned away from the part W1x in the +Z direction. As described above, in the case of using the separator 40x in the comparative example, the anode gas might not be sufficiently supplied to a part of the MEA 11, so that the power generation performance might be deteriorated.

However, in the present embodiment as illustrated in FIG. 3A, the amplitude A2 of the groove 412 closest to the groove 411 is smaller than each amplitude of the grooves 413 to 416. Therefore, a part W1 where the width of the rib 431 between the grooves 411 and 412 in the X direction is the largest is smaller than the part W1x described above. It is therefore possible to suppress the anode gas from not being partially supplied to a part of the MEA 11, and to suppress the deterioration of the power generation performance. This also suppresses the deterioration of the power generation performance due to the deterioration of the catalyst layer 14a caused by hydrogen deficiency.

The grooves 412 to 416 are arranged in ascending order of the amplitude, and in ascending order of the distance from the groove 411. This suppresses an increase in the width of the rib 432, in the X direction, between the grooves 412 and 413 slightly different in amplitude. The same applies to each of the ribs 433 to 435. As described above, the increase in the width of each of the ribs 432 to 435 in the X direction is suppressed, thereby uniformly suppling the anode gas to the MEA 11.

Further, if the amplitude difference between the grooves 411 and 412x is large as in the comparative example, the difference in pressure loss of the anode gas between the grooves 411 and 412x might increase, so that the anode gas might not be supplied to a part of the MEA 11. In the present embodiment, since the amplitude A2 of the groove 412 is smaller than amplitude A2x of the groove 412x, the increase in the difference in pressure loss of the anode gas between the grooves 411 and 412 is suppressed. This suppresses the anode gas from not being supplied to a part of the MEA 11, which suppresses the deterioration of the power generation performance. Additionally, the increase in difference in pressure loss of the anode gas between the grooves 412 and 413 is suppressed. The same applies to the grooves 413 to 416. It is thus possible to uniformly supply the anode gas to the MEA 11.

Further, as described above, the flow path groove 44 through which the coolant flows is formed on the rear side of the rib 43. Thus, the two flow path grooves 44 are formed on the rear side of the ribs 431 and 432, and are formed into substantially the same shape as the ribs 431 and 432. It is therefore possible to suppress an increase in the difference in pressure loss of the coolant between the flow path grooves 44 formed on the rear side of the ribs 431 and 432. It is thus possible to suppress the MEA 11 from not being partially cooled due to a part where the coolant hardly flows, and to suppress the deterioration of the power generation performance. The same applies to the pressure loss of the coolant between the flow path grooves 44 on the rear side of the ribs 433 to 435. Accordingly, the MEA 11 is uniformly cooled.

Further, as for the separator 40x in the comparative example, in the region from the groove 412x to the groove 416x, the elongation percentage of the base material in the press working might increase, and the yield rate might decrease. In the present embodiment, since the amplitude gradually changes between the grooves 412 to 416, it is possible to suppress the increase in the elongation percentage of the base material in the region from the groove 412 to the groove 416, and to suppress the decrease in the yield rate.

Further, the separator 40x in the comparative example might be subjected to the large residual stress in the press working due to the difference in shape between the groove 411 and the groove 412 x closest thereto. This residual stress might cause warpage in the separator 40x. In the present embodiment, the grooves 416 to 412 are arranged in descending order of the amplitude, in other words, in order of similarity to a linear shape. It is thus possible to reduce the residual stress in the press working, and to reduce the possibility that the warpage occurs in the separator 40.

Conceivably, the fuel cell 1 in the present embodiment is used in a posture in which the groove 411 is located below the grooves 412 to 416 in the gravity direction such that the −X direction is the downward gravity direction. In this case, for example, even if water generated on the anode side flows into the groove 411, since the groove 411 has a linear shape, the staying of water in the groove 411 is suppressed, and the anode gas flowing in the groove 411 allows water to flow to the downstream side. In this way, the drainability is improved. Even in the case where the fuel cell 1 is used in a posture in which the X direction is inclined with respect to the gravity direction, the staying of water in the groove 411 is suppressed and the drainability is ensured as long as the groove 411 is positioned below the grooves 412 to 416 in the gravity direction.

Figure 4A:
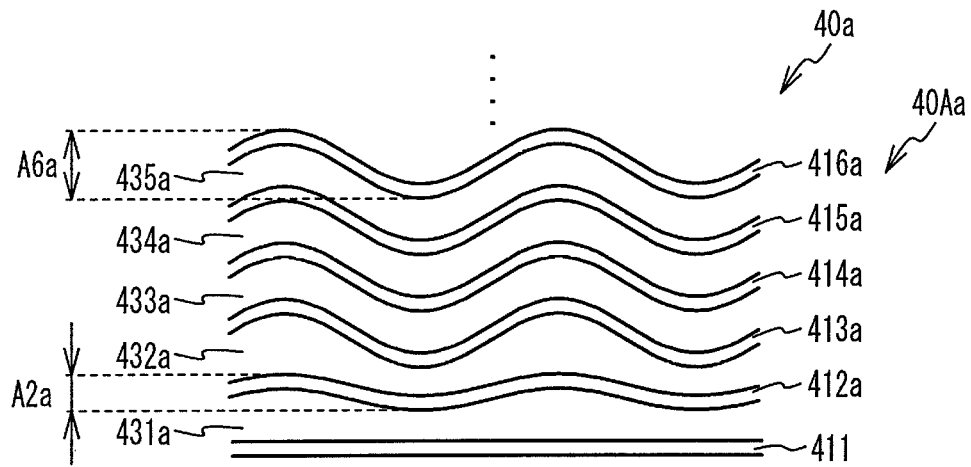
FIG. 4A is an enlarged view illustrating a part of a flow path portion of a separator in a first variation.

Next, variations will be described. In variations, the same reference numerals are given to the same components as those of the above-described embodiment, and duplicated explanation is omitted. FIG. 4A is an enlarged view illustrating a part of a flow path portion 40Aa of a separator 40a in a first variation. The flow path portion 40Aa includes the groove 411 having a linear shape and grooves 412a to 416a each having a wavy shape. The grooves 412a to 416a have substantially the same wavelength and the same phase. The grooves 413a to 416a have substantially the same amplitude, for example, each amplitude of the grooves 413a to 415a is the same as amplitude A6a of the groove 416a as illustrated in FIG. 4A. In a case where the groove 413a is an example of the second wavy groove, any grooves 414a to 416a are an example of the third wavy groove. In this variation, the amplitude of the second wavy groove and the amplitude of the third wavy groove are the same. In contrast, amplitude A2a of the groove 412a, which is an example of the first wavy groove, is smaller than each amplitude of the grooves 413a to 416a. Even in such a configuration, it is possible to suppress the increase in the width of the rib 431a in the X direction between the grooves 411 and 412a, and to suppress the anode gas from not being supplied to a part of the MEA 11. This suppresses the deterioration of the power generation performance. Due to the above-described shapes of the grooves 412a to 416a, the width of the rib 432a in the X direction changes depending on a position in the Y direction, but each width of the ribs 433a to 435a in the X direction is constant in the Y direction.

Additionally, the grooves 413a to 416a have substantially the same wavelength, the same phase, the same amplitude, and the common shape. Here, in general, as for pressing, the shape of a metal plate formed by dies is not always the same as the reversed shape of the die. After the metal plate is deformed by the die, the shape of the metal plate slightly becomes to its original shape before the molding, due to the elasticity of the metal plate. This is called spring back. For this reason, this spring back is taken into consideration in designing the dies. In a case where groove shapes differ from each other, it might be needed to design the dies for the respective groove shapes, and it might take a long time for designing the dies. In the present embodiment, the grooves have the common shape. It is thus possible to suppress the long time required to design the dies. In the case of forming a precise shape like a separator for a fuel cell, the metal plate is pressed with different dies several times, so that the metal plate is gradually expanded to achieve the final product shape. In a case where the wavy shapes in the final product shape differ from each other, the design of the dies used in pressing is different, so that the time required to design the dies might be further prolonged. On the other hand, the grooves 413a to 416a have the common shape in the present embodiment. It is thus possible to form the common shape in the dies for pressing, and to suppress the prolongation of the time required to design the dies for producing the separator 40a.

Figure 4B:
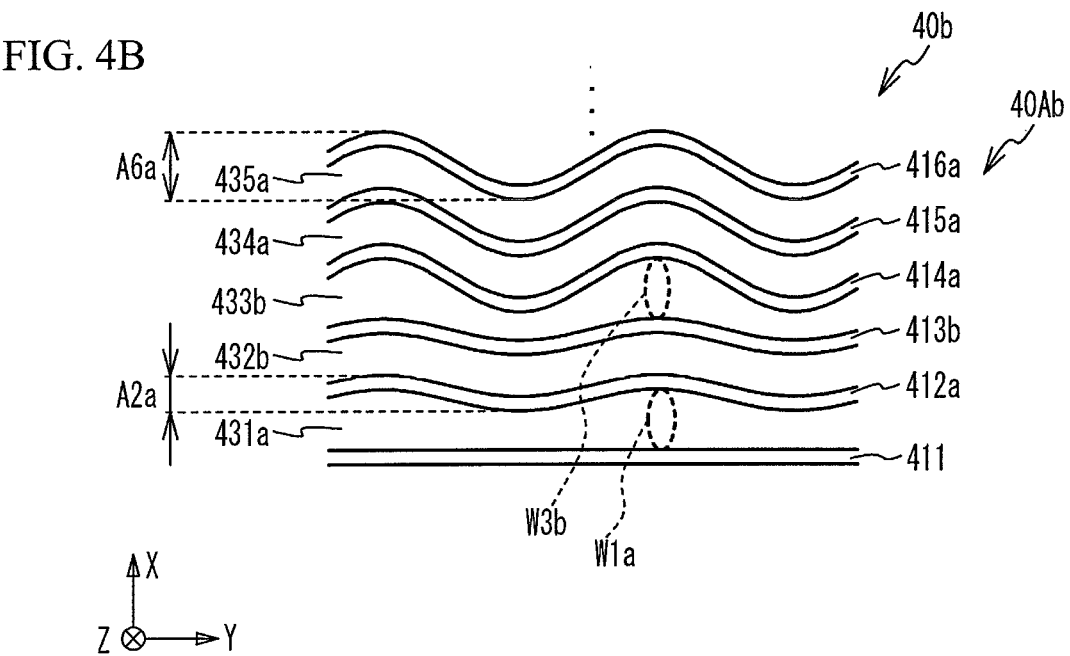
FIG. 4B is an enlarged view illustrating a part of a flow path portion of a separator in a second variation.

FIG. 4B is an enlarged view illustrating a part of a flow path portion 40Ab of a separator 40b in a second variation. The amplitude of a groove 413b located between the grooves 412a and 414a is substantially the same as the amplitude of the groove 412a. Therefore, the width, in the X direction, of a rib 432b located between the grooves 412a and 413b is substantially constant in the Y direction. In contrast, since there is an amplitude difference between the grooves 413b and 414a, the width of a part W3b which has the maximum width of the rib 433b located between the grooves 413b and 414a is greater than the width of the rib 432b in the X direction. The width of the part W3b is substantially the same as the width of the part W1a which has the maximum width of the rib 431a. In this way, the parts W1a and W3b where widths are increased are distant away from each other in the X direction via the groove 412a, the rib 432b, and the groove 413b. Therefore, as compared with a case where such two parts are adjacent to each other via one groove, it is possible to suppress parts, to which the anode gas is relatively difficult to be supplied, from being adjacent to each other, and to supply uniformly the anode gas to the MEA 11.

The flow path grooves in the present embodiment and variations described above may be applied to the cathode separator.

Although the separators 40, 40a, and 40e are adopted in the water-cooled fuel cell 1 using liquid as the coolant, they are not limited thereto, and may be adopted in an air-cooled fuel cell using air as the coolant.

The wavy groove described above may have a sine wave shape, or a wavy shape with a straight line and an arc.

In the above-described embodiment and variation, the wavy grooves have substantially the same wavelength and the same phase, but they are not limited thereto. In any case, it is possible to suppress the increase in the interval between the linear groove and the wavy groove closest to the linear groove, as long as the amplitude of the wavy groove closest to the linear groove is smaller than the amplitude of the other wavy groove located opposite to the linear groove with respect to the wavy groove. Further, in the above-described embodiment and variations, the wavy grooves and the linear groove are formed at substantially the same pitch interval, but they are not limited thereto.

Although some embodiments of the present disclosure have been described in detail, the present disclosure is not limited to the specific embodiments but may be varied or changed within the scope of the present disclosure as claimed.

What is claimed is:

1. A fuel cell comprising:
a membrane electrode assembly; and
a separator disposed on one side of the membrane electrode assembly,
wherein
the separator includes flow path grooves through which reactant gas flows between the separator and the membrane electrode assembly,
the flow path grooves include:
wavy grooves wavily extending in a first direction and arranged in a second direction orthogonal to the first direction; and
a linear groove linearly extending in the first direction,
the wavy grooves include:

a first wavy groove located closest to the linear groove among the wavy grooves; and a second wavy groove located opposite to the linear groove with respect to the first wavy groove, and amplitude of the first wavy groove is smaller than that of the second wavy groove.

2. The fuel cell of claim 1, wherein wavelengths of the first and second wavy grooves are identical to each other.

3. The fuel cell of claim 2, wherein phases of the first and second wavy grooves are identical to each other.

4. The fuel cell of claim 1, wherein wavelengths of all of the wavy grooves are identical to each other, and phases of all of the wavy grooves are identical to each other.

5. The fuel cell of claim 1, wherein the linear groove is located below the wavy grooves in a gravity direction.

6. The fuel cell of claim 1, wherein the wavy grooves include a third wavy groove located opposite to the first wavy groove with respect to the second wavy groove, and amplitude of the second wavy groove is smaller than or equal to amplitude of the third wavy groove.

7. The fuel cell of claim 1, wherein amplitude of the wavy groove is smaller as the wavy groove is located closer to the linear groove.

8. The fuel cell of claim 1, wherein the separator is an anode separator disposed on an anode side of the membrane electrode assembly.

* * * * *